United States Patent Office 2,912,457
Patented Nov. 10, 1959

2,912,457

PROCESS FOR THE PURIFICATION OF TEREPHTHALIC ACID ESTERS

Bruno Blaser, Dusseldorf-Urdenbach, and Wilhelm Jakob Kaiser, Dusseldorf-Holthausen, Germany, assignors to Henkel & Cie. G.m.b.H., Dusseldorf-Holthausen, Germany, a corporation of Germany No Drawing. Application September 22, 1955
Serial No. 536,036

Claims priority, application Germany October 2, 1954

7 Claims. (Cl. 260—475)

This invention relates to a process for purifying esters of terephthalic acid, and more particularly to a method of purifying lower aliphatic alcohol diesters of terephthalic acid.

It is well known that terephthalic acid is an important raw material in the manufacture of synthetic fibers, such as Dacron. The purity of these fibers, and the raw materials from which they are produced, must meet very high standards, because the presence of even comparatively small amounts of impurities will cause the finished product to discolor in use.

When produced on an industrial scale, terephthalic acid is usually purified by converting the acid into a lower aliphatic alcohol ester, particularly the dimethyl ester or the diethyl ester, and then distilling or recrystallizing the ester. Despite this meticulous purification, however, the synthetic fiber produced from the purified terephthalic acid still has the disadvantage that it is sometimes faintly yellow or tends to turn yellow in use.

It is an object of the present invention to provide a process for purifying terephthalic acid esters, whereby impurities contained therein are removed so completely that the finished synthetic fiber meets the most rigorous standards with respect to resistance against discoloration.

Other objects and advantages of our invention will become apparent as the description thereof proceeds.

We have found that terephthalic acid esters can be completely freed from impurities contained therein by first heating the esters to temperatures above 200° C. and then subjecting them to the usual purification treatment, such as distillation or crystallization. While the theory underlying this beneficial treatment is not entirely understood, the heating apparently brings about a transformation of the impurities which, in turn, makes it possible to remove such impurities from the esters more completely than by the methods heretofore known.

In most cases, the terephthalic acid esters to be purified are diesters which, when distilled at subatmospheric pressures up to 0.1 mm. Hg, pass over at temperatures up to 300° C. These esters may be treated in accordance with the present invention either in the raw state or also after having been subjected to a preliminary purification treatment, for example, by distillation or crystallization.

The temperatures to which the terephthalic acid esters are heated may vary between 200 and 330° C., but temperatures above 250° C. and below 300° C. are preferred. The duration of the heating step depends upon the temperature selected and upon other variable conditions, for example, the amount of impurities in the raw terephthalic acid ester. As a general rule, however, 5 to 10 hours of heating are sufficient if the temperature is above 250° C.; at temperatures below 250° C., the duration of the heating step may be extended to 20 hours or more.

The terephthalic acid esters may be heated at subatmospheric, atmospheric or superatmospheric pressures. The lower limit of subatmospheric pressure is determined by the vapor pressure of the ester at the prevailing temperature. The superatmospheric pressure may range up to 25 atmospheres gauge, but in most cases it is not necessary to heat the terephthalic acid ester at superatmospheric pressures.

The purification of terephthalic acid esters in accordance with the present invention is supported by the presence of oxygen, preferably in the form of air or any other convenient gaseous mixture containing oxygen. In order to provide intimate contact between the ester and the oxygen, it is advantageous to pass a stream of air through the hot ester, or when working at superatmospheric or subatmospheric pressures in an autoclave by intensively stirring the ester in the atmosphere of air.

The heating treatment of terephthalic acid esters according to our invention may, however, also be carried out in the presence of other gases, provided these gases are inert under the reaction conditions, for example, in the presence of nitrogen, carbon dioxide, etc.

The treatment of terephthalic acid esters above-described may, in addition, be carried out in the presence of catalysts. Suitable catalysts for this purpose are metals or metal oxides, provided they are inert with respect to the terephthalic acid ester; in other words, saponifying metals, such as alkali metals or alkaline earth metals, and their oxides are excluded. Examples of metals which may be present as catalysts during the heating procedure, either in their elemental form or in the form of their oxides, are silver, aluminum, iron, copper, zinc, manganese, lead and the like. The amount of catalyst used may range up to 20% by weight based upon the weight of terephthalic acid ester, but in most instances it is not necessary to use more than 5% by weight of the catalyst. After completion of the heat treatment, the catalyst may be separated from the ester by any suitable method, for example, by filtration. However, if the heat-treated ester is to be subsequently purified by distillation, the catalyst may, if desired, remain admixed therewith.

Through the heat-treatment according to the present invention, the impurities present in the technical grade terephthalic acid diesters are transformed in such a fashion that they may readily and completely be separated from the ester by a subsequent purification procedure, for example, by distillation or crystallization.

If the separation of the impurities from the ester subsequent to the heat treatment is carried out by distillation, it is advantageous to operate under conditions which do not permit the ester in the distillation vessel to be heated to temperatures above 300° C. for extended periods of time. However, if continuously operating distillation apparatus are used in which only relatively small amounts of ester are heated for comparatively short periods of time, temperatures up to 330° C. may safely be applied.

In some instances, it is possible to achieve an improved combination of individual purifying effects by combining the various purifying operations above described, for example, by first subjecting the terephthalic acid ester to a preliminary purification by distillation or crystallization, then heating the ester in the presence of catalysts while passing air through the hot ester, and finally again purifying the heat-treated ester by distillation or crystallization. The manner in which the individual steps should be combined depends upon various factors, such as the composition of the starting material, and should be determined for each case by preliminary experiments. For example, experience has shown that it is very advantageous to subject the raw terephthalic acid ester to a preliminary purification prior to the heat-treatment. If the preliminary purification step is omitted, a single purification step subsequent to the heat-treatment is sometimes not enough to achieve an end product of sufficiently high quality, and it therefore becomes necessary to repeat the distillation or crystallization. In some special cases, it is also necessary to subject the ester to another heat-treatment at temperatures above 200° C., if desired in the presence of oxygen and/or catalysts, after the purification step following the first heat-treatment. However, the repetition of the heat-treatment is required only if particularly impure starting materials are being treated.

A single heat-treatment in accordance with our invention suffices to obtain a product of excellent quality from terephthalic acid esters of ordinary technical purity.

The advantageous results of the purification process according to the present invention can be illustrated and tested by heating the purified terephthalic acid esters to temperatures of 200° C. and higher; under these conditions, the purified esters turn only very faintly yellow or do not discolor at all, while terephthalic acid esters purified in accordance with the methods heretofore known turn distinctly yellow. This discoloration test may be carried out in the absence or in the presence of air. In the presence of air the testing conditions are much more strict, because the ester will turn yellow considerably more readily in the presence of air than in the absence of air.

The following examples will further illustrate our invention and enable others skilled in the art to understand the invention more completely. It will be understood, however, that we do not intend to limit our invention to the precise conditions recited in the examples.

The terephthalic acid esters used in Examples I and VIII below, were produced from terephthalic acid formed by the oxidation of p-xylene. The terephthalic acid esters used in the remaining examples were obtained from terephthalic acid produced, in the form of its dipotassium salt, by a rearrangement of dipotassium orthophthalate at elevated temperatures in an atmosphere of $CO_2$ under pressure.

Unless it is specifically stated in the examples that the terephthalic acid ester was subjected to a preliminary purification procedure, either by distillation or by crystallization, the yellow or brown raw product obtained by esterification of terephthalic acid with methanol on an industrial scale was used as the starting material.

Since there is very little temperature difference between the boiling point of the dimethyl ester of terephthalic acid at 7 mm. Hg (about 145° C.) and the melting point of the ester (about 140° C.), the distillation of this ester involved certain difficulties in that the distilled ester solidified in the condenser and thus plugged up the condenser tube. With the exception of Example I, therefore, a distillation apparatus was used in which the discharge tube for the distilled terephthalic acid ester vapors was insulated. The discharge tube was not provided with a thermometer, so that the examples do not give more detailed indications regarding the boiling points of the various distillation fractions. The relative quantity of these fractions was determined by a preliminary test distillation of a small amount of the treated ester in a sausage flask.

Example I 1,050 parts by weight of terephthalic acid dimethyl ester, which had been subjected to a preliminary purification (acid No.=0.2–0.3; saponification No.=579–580; corrected M.P.=140.5–140.8° C.) were refluxed (280° C.) for 8½ hours at atmospheric pressure. Thereafter, the ester was fractionally distilled at a subatmospheric pressure of 7 mm. Hg in a column packed with Beri-type saddles made of rust-proof steel wire netting. The main fraction (793 parts by weight; B.P. 7 mm. Hg=144–146° C.) had the same melting point and the same acid number as the untreated product.

Samples of the treated and the untreated terephthalic acid dimethyl ester weighing 50 gm. each were melted and placed into separate evacuated flasks, each having a net volume of 250 cc. Thereafter, the flasks were heated to 200° C. in a drying chamber. While the untreated sample turned distinctly yellow after only 1½ hours and dark brown after ten hours, the treated product showed no discoloration whatever after 70 hours' heating.

In the remainder of the examples the purity test was carried out in this manner unless specifically stated to the contrary.

Example II

Terephthalic acid dimethyl ester was subjected to a preliminary purification by distillation in vacuo in a packed column. The distilled ester had an acid number of 0.3, a saponification number of 578 and a melting point of 140.6–140.9° C.; when heated in a melting point tube, sintering took place beginning at 140.2° C. 1,023 parts by weight of this distilled ester were refluxed at atmospheric pressure for 8 hours and 20 minutes, and thereafter distilled in vacuo in a column packed with wire netting saddles. Samples of the main fraction, which amounted to a total of 729 parts by weight, did not show any discoloration even after being subjected to the purity test for 70 hours. In contrast thereto, the merely distilled ester discolored after only a few hour's heating.

Example III 1,166 parts by weight of unpurified terephthalic acid dimethyl ester, as obtained by commercial esterification of terephthalic acid with methyl alcohol, were refluxed at atmospheric pressure for 8 hours and then distilled in vacuo, as described in the previous examples. 882 parts by weight of a main fraction were obtained, which had an acid number of 1.1, a saponification number of 579–580, and a corrected melting point of 139.8–140.7° C. 670 parts by weight of this main fraction were again distilled and yielded 564 parts by weight of a main fraction having an acid number of 0.0, a saponification number of 579–580, and a corrected melting point of 140.5–140.9° C. When subjected to the purity test, the ester which had been distilled only once turned distinctly yellow after 15 hours, whereas the twice-distilled product showed no discoloration even after 40 hours of heating at 200° C.

Example IV 30 parts by weight of a copper wire mesh which had been freshly reduced in a stream of hydrogen was placed into 1000 parts by weight of raw, unpurified terephthalic acid dimethyl ester; thereafter, the mixture was refluxed for 8 hours at atmospheric pressure, and then distilled in vacuo, as described in the preceding examples. 683 parts by weight of a main fraction were obtained which had a corrected melting point of 140.7–140.9° C., an acid number of 0.2, and a saponification number of 581. When subjected to the previously described purity test, the purified product did not show any yellow discoloration even after 48 hours of heating.

Example V

The procedure of Example IV was repeated several times, but in place of the copper wire mesh, equal quantities of zinc dust, iron powder, aluminum powder, manganese dioxide (pyrolusite), red lead (minium), a mixture of equal parts of copper powder and zinc dust, and a thin sheet of silver provided with a plurality of holes were used as the catalyst in the various runs. In all cases the purified terephthalic acid ester was found to be as pure as the ester obtained in Example IV.

Example VI

Technical grade terephthalic acid dimethyl ester was subjected to a preliminary purification by vacuum distillation and then heated to 230–240° C. at atmospheric pressure for 60 hours, using a steam coil as the source of heat. Thereafter, the ester was distilled in a vacuum of 10 mm. Hg in a column packed with clay Raschig rings. 109 parts by weight of a main fraction were obtained. In the purity test, the purified ester showed a very faint, barely perceptible discoloration after 20 hours.

*Example VII*

1000 parts by weight of technical grade terephthalic acid dimethyl ester were refluxed for 8 hours without preliminary purification. While refluxing, a continuous stream of air was passed through the boiling ester. Thereafter, the ester was distilled at a vacuum of 12 mm. Hg in the packed column described in Example I. The first fractions amounting to about 46 parts by weight were discarded, and 713 parts by weight of a main fraction were collected which had an acid number of 0.4, a saponification number of 580 and a corrected melting point of 140.5–140.8° C.; when heated in a melting point tube, the purified ester began to sinter at about 140.3° C.

In this case, the purity test was carried out in a non-evacuated flask containing air at atmospheric pressure. While the technical grade, unpurified ester turned distinctly yellow after about 3 hours of heating, the purified product showed no discoloration after 8 hours, and only slight discoloration after 24 hours.

*Example VIII*

Technical grade, unpurified terephthalic acid dimethyl ester was fused in the presence of air in a flask having a capacity of 500 cc., and thereafter held at 200° C. for 100 hours. Subsequently, the ester was distilled at a vacuum of 7 mm. Hg in a sausage flask and the fraction passing over between 144 and 146° C. was collected. When subjected to the purity test, the ester turned deep yellow after 48 hours.

*Example IX*

1,100 parts by weight of technical grade, unpurified terephthalic acid dimethyl ester were refluxed for 8 hours and then distilled at atmospheric pressure; the main fraction passing over between 280 and 290° C. was collected. This fraction amounted to about 882 parts by weight and had an acid number of 1.1, a saponification number of 578–580, and a corrected melting point of 139.8–140.7° C. A sample of this product was subjected to the purity test, but it turned dark yellow after only 15 hours' heating at 200° C.

670 parts by weight of the first distillate were again distilled in a vacuum of 7 mm. Hg, whereby 564 parts by weight of a main fraction were collected which had an acid number of 0.2, a saponification number of 579–580, and a corrected melting point of 140.5–140.9° C. When heated in a melting point tube, it began to sinter at 140.2° C. (corrected). Upon being subjected to the purity test, the redistilled product did not show any discoloration even after being heated at 200° C. for 40 hours.

*Example X*

Technical grade terephthalic acid dimethyl ester was subjected to a preliminary purification by distillation, and 500 parts by weight of the distillate were then heated at 280° C. for eight hours in a shaker autoclave. Prior to heating, however, nitrogen was introduced into the autoclave until the internal pressure reached 3 atmospheres gauge. 400 parts by weight of the resulting product were distilled in a vacuum of 9 mm. Hg. The main fraction of the distillate having an acid number of 0.3, a saponification number of 579, and a corrected melting point of 140.6–140.9° C. showed no discoloration after being subjected to the purity test for 40 hours.

While we have given certain specific embodiments of our invention, we wish it to be understood that the present invention is not limited to such embodiments, and that various changes and modifications can be made therein without departing from the spirit of the invention or the scope of the appended claims.

We claim:

1. In a process of separating lower aliphatic alcohol diesters of terephthalic acid from impurities leading to discoloration admixed therewith, said diesters being selected from the group consisting of methyl and ethyl diesters, the step of heating said esters to a temperature from above 200 to about 330° C. for a period of time of at least about 5 hours.

2. In a process of separating lower aliphatic alcohol diesters of terephthalic acid from impurities leading to discoloration admixed therewith, said diesters being selected from the group consisting of methyl and ethyl diesters, the step which comprises heating said esters to a temperature from above 200 to about 330° C. for a time of at least about 5 hours in the presence of a substance selected from the group consisting of metallic silver, aluminum, iron, copper, zinc, manganese, lead and their oxides.

3. In a process of separating lower aliphatic alcohol diesters of terephthalic acid from impurities leading to discoloration admixed therewith, said diesters being selected from the group consisting of methyl and ethyl diesters, the step which comprises heating said esters to a temperature from above 200 to about 330° C. for a time of at least about 5 hours while intimately contacting the hot ester with an inert gas selected from the group consisting of oxygen, air, nitrogen and carbon dioxide.

4. In a process of separating lower aliphatic alcohol diesters of terephthalic acid from impurities leading to discoloration admixed therewith said diesters being selected from the group consisting of methyl and ethyl diesters, the step which comprises heating said esters to a temperature from above 200 to about 330° C. for at least 5 hours in the presence of a substance selected from the group consisting of metallic silver, aluminum, iron, copper, zinc, manganese, lead and their oxides, while intimately contacting the hot ester with an inert gas selected from the group consisting of oxygen, air, nitrogen and carbon dioxide.

5. The method of purifying technical grade lower aliphatic alcohol diesters of terephthalic acid, said diesters being selected from the group consisting of methyl and ethyl diesters, which comprises heating said esters to a temperature from above 200 to about 330° C. for at least 5 hours, and thereafter separating the pure esters from the impurities.

6. The method of purifying technical grade lower aliphatic alcohol diesters of terephthalic acid, said diesters being selected from the group consisting of methyl and ethyl diesters, which comprises first subjecting the esters to a preliminary purification by distillation, thereafter heating said esters to a temperature from above 200 to about 330° C. for at least 5 hours, and finally separating the pure esters from the residual impurities.

7. The method of purifying technical grade terephthalic acid dimethyl ester, which comprises distilling said ester to remove the principal portion of impurities heating the purified ester to a temperature from above 200 to about 330° C. in the presence of a substance selected from the group consisting of metallic silver, aluminum, iron, copper, zinc, manganese, lead and their oxides, metals and their oxides for at least 5 hours and separating the pure ester from the residual impurities.

References Cited in the file of this patent

UNITED STATES PATENTS

| | | |
|---|---|---|
| 907,941 | Zeitschel | Dec. 29, 1908 |
| 1,708,404 | Zimmerli | Apr. 9, 1929 |
| 1,815,878 | Van Schaack | July 21, 1931 |
| 2,197,546 | Baxter et al. | Apr. 16, 1940 |
| 2,776,984 | Mention et al. | Jan. 8, 1957 |